United States Patent [19]

Koyama

[11] Patent Number: 5,751,409

[45] Date of Patent: May 12, 1998

[54] MULTI-POINT DISTANCE MEASURING APPARATUS

[75] Inventor: Takeshi Koyama, Yokohama, Japan

[73] Assignee: Canon Kabushiki Kaisha, Tokyo, Japan

[21] Appl. No.: 534,647

[22] Filed: Sep. 27, 1995

[30] Foreign Application Priority Data

Sep. 29, 1994 [JP] Japan .................... 6-259412

[51] Int. Cl.$^6$ .................................. G01C 3/00
[52] U.S. Cl. ..................... 356/3.14; 356/3.08; 396/89
[58] Field of Search .................. 356/3.14, 3.15, 356/3.08; 396/89

[56] References Cited

U.S. PATENT DOCUMENTS

| | | | |
|---|---|---|---|
| 4,843,415 | 6/1989 | Matsui et al. | 354/403 |
| 4,855,777 | 8/1989 | Suda et al. | 354/402 |
| 5,218,414 | 6/1993 | Kajiwara | 356/1 |
| 5,386,285 | 1/1995 | Asayama | 356/1 |
| 5,432,594 | 7/1995 | Ogawa | 356/3.14 |

*Primary Examiner*—Mark Hellner
*Attorney, Agent, or Firm*—Fitzpatrick, Cella, Harper & Scinto

[57] ABSTRACT

An optical apparatus for performing multi-point distance measurement by measuring the distance to an object using a triangulation method and light received from the object, includes first and second light-receiving systems each constituted by a multi-eye lens in which a plurality of elementary lenses are disposed adjacent to each other in a base line direction, and a photoelectric conversion element. The first and second light-receiving systems respectively form images of regions of the object, which correspond to the elementary lenses constituting the multi-eye lenses and are separated from each other, on the photoelectric conversion elements.

13 Claims, 3 Drawing Sheets

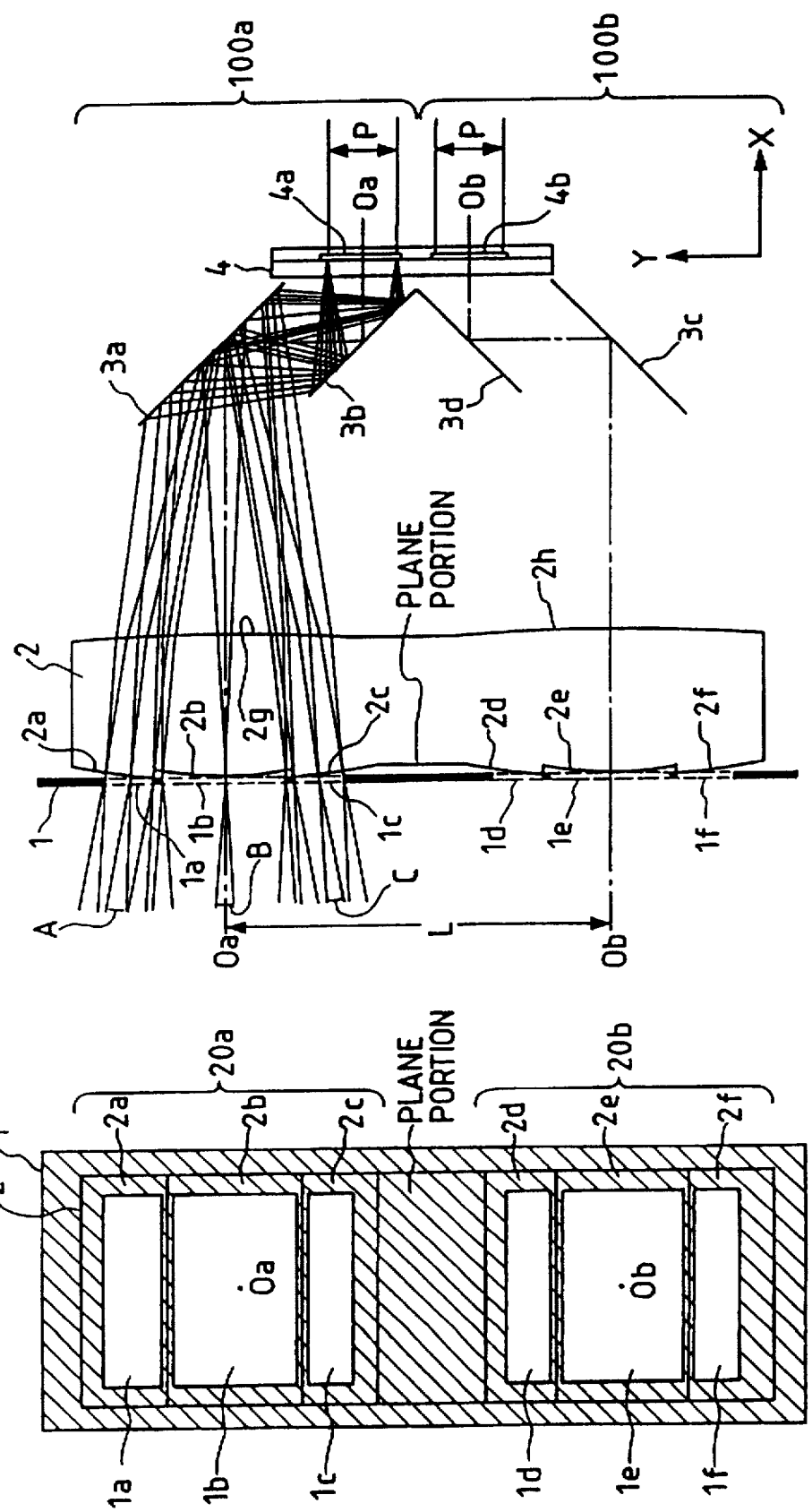

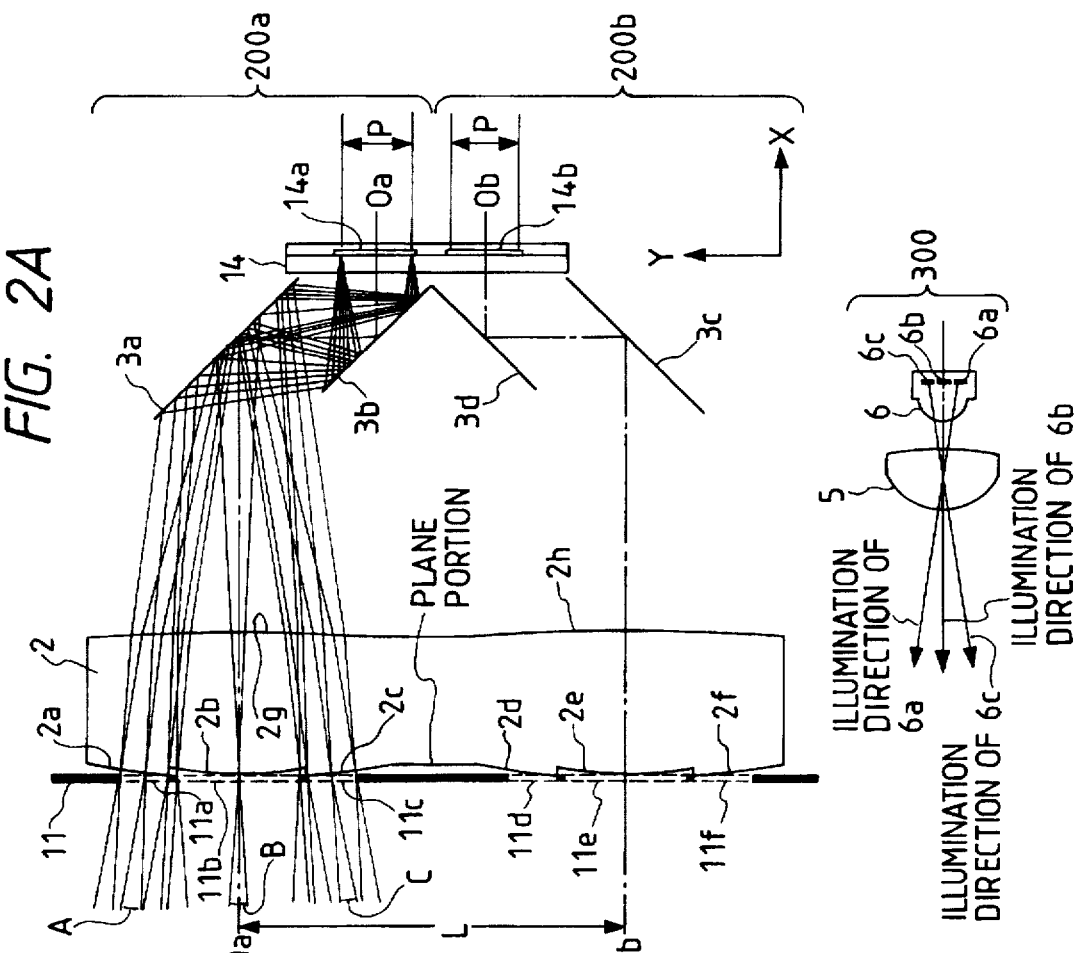
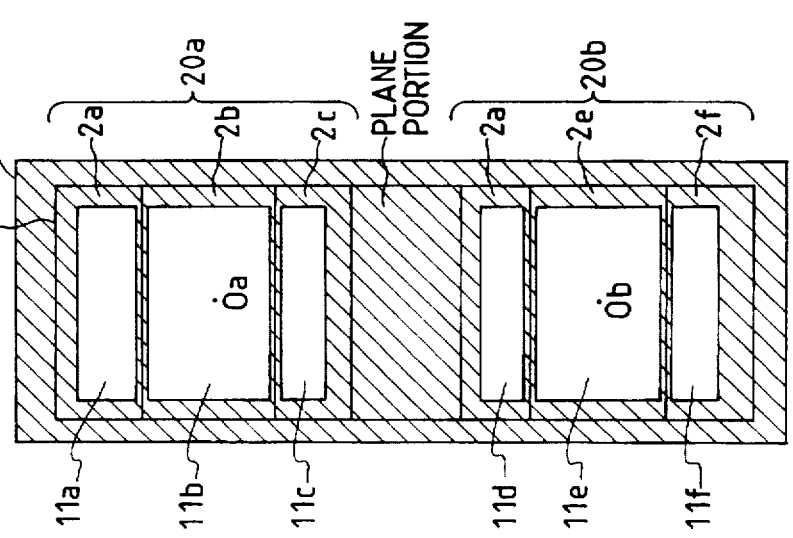
FIG. 2A
FIG. 2B

MULTI-POINT DISTANCE MEASURING APPARATUS

BACKGROUND OF THE INVENTION

1. Field of the Invention

The present invention relates to a multi-point distance measuring apparatus and, more particularly, to an apparatus preferable for a case wherein the distance to an object is measured for a plurality of regions (portions) of an object with respect to a very wide field angle range on the object side in an optical apparatus such as a camera.

2. Related Background Art

Conventionally, as a distance measuring apparatus for, e.g., a camera, a so-called passive type distance measuring apparatus and a so-called active type distance measuring apparatus are known. The former apparatus uses a pair of light-receiving systems disposed to be separated by a predetermined base length; the apparatus receives images of an object formed by the two light-receiving systems using a photoelectric conversion element array, and calculates the distance to the object on the basis of a deviation amount in the base line direction between the two images. The latter apparatus projects a light spot toward the object side, and measures the distance to the object by receiving light reflected by the object. In particular, as an example of the latter apparatus, an apparatus which performs distance measurement over a wide field angle range by projecting a light spot in a plurality of directions toward the object side is known.

However, in the passive type distance measuring apparatus of conventional apparatuses, if distance measurement is to be performed in a wider field angle range at the object side, then the focal length of a light-receiving lens must be shortened, or the length of the photoelectric conversion element array must be increased. In this case, the distance measurement precision is impaired, or the element cost increases.

On the other hand, in the active type distance measuring apparatus as well, if distance measurement is to be performed in a wider field angle range at the object side, then the same drawbacks as in the passive type distance measuring apparatus are posed. Furthermore, since the interval between a light projection system and a light-receiving system is set to be equal to the base length, when the projected light spot is partially vignetted by an object, this phenomenon results in movement of the center of gravity of the projected light, and an error is consequently generated in the distance measurement value.

For example, when the distance to an object having a black-and-white pattern in the base length direction is to be measured or when the projected light spot only partially strikes an object and the remaining light spot misses the object, an error is easily generated in the distance measurement value.

SUMMARY OF THE INVENTION

It is an object of the present invention to provide a compact passive type multi-point distance measuring apparatus which can precisely attain distance measurement for a plurality of regions (portions), i.e., so-called multi-point distance measurement, in a very wide field angle range on the object side using a short photoelectric conversion element array.

It is another object of the present invention to provide a compact active type distance measuring apparatus which can attain multi-point distance measurement in a very wide field angle range on the object side using a short photoelectric conversion element without being influenced by vignetting, deformation, and the like of the shape of a projected light spot by an object.

According to the present invention, a multi-point distance measuring apparatus measures a distance to an object by a triangulation method using light received from the object. The apparatus includes first and second light-receiving systems each constituted by a multi-eye lens in which a plurality of elementary lenses are disposed adjacent to each other in a base line direction, and a photoelectric conversion element, wherein the first and second light-receiving systems respectively form images of regions of the object, which correspond to the elementary lenses constituting the multi-eye lenses and are separated from each other, on the photoelectric conversion elements.

In another aspect, the multi-point distance measuring apparatus of the present invention preferably further includes shutter means having a plurality of apertures corresponding to the elementary lenses of the multi-eye lenses, wherein the shutter means switches images to be formed on the photoelectric conversion elements of a portion of the object by time-sharingly controlling an opening/closing operation of the apertures.

In another aspect, the multi-point distance measuring apparatus of the present invention preferably includes a first reflection surface for deflecting light beams transmitted through the multi-eye lenses of the first and second light-receiving systems in opposite directions, and a second reflection surface for deflecting the light beam deflected by the first reflection surface in directions parallel to optical axes of the multi-eye lenses.

The multi-point distance measuring apparatus according to another aspect of the present invention includes a light projection system for projecting a light spot onto the object, wherein the first and second light-receiving systems form images of light reflected by the object of the light spot projected by the light projection system on the photoelectric conversion elements.

In another aspect, the light projection system of the multi-point distance measuring apparatus of the present invention preferably time-sharingly switches and projects the light spot to each of plural regions of the object, which correspond to the elementary lenses constituting the multi-eye lenses and are separated from each other.

When the multi-point distance measuring apparatus of the present invention is adopted in an optical apparatus such as a camera, the above-mentioned effects are expected.

BRIEF DESCRIPTION OF THE DRAWINGS

FIGS. 1A and 1B are schematic views showing a principal part of the first embodiment of the present invention;

FIGS. 2A and 2B are schematic views showing a principal part of the second embodiment of the present invention.

DETAILED DESCRIPTION OF THE PREFERRED EMBODIMENTS

Figure 3A:
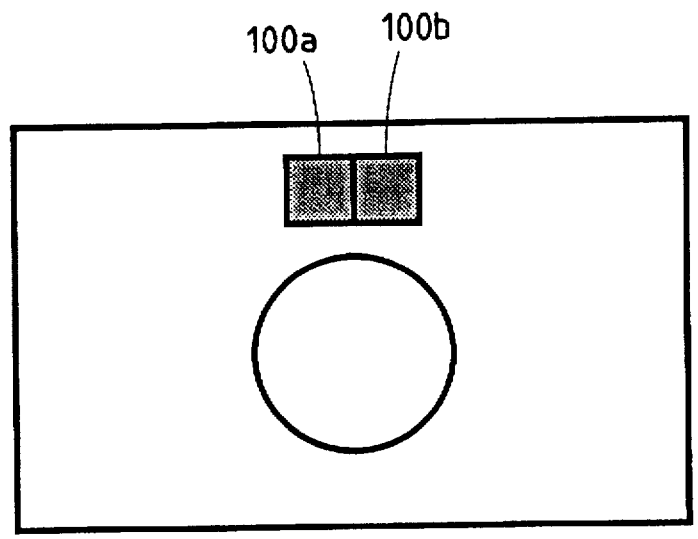
FIGS. 3A and 3B are views showing an optical apparatus having a multi-point distance measuring apparatus of the present invention.

FIGS. 1A and 1B are schematic views showing the arrangement of the first embodiment of the present invention. This embodiment exemplifies a passive type distance measuring apparatus which is built in an optical apparatus such as a camera. FIG. 1A is a plan view of the first embodiment, and FIG. 1B is a front view of the first embodiment. In FIG. 1A, an object to be photographed is present on the left side. For the sake of descriptive convenience, the extending direction of the optical axis of a light-receiving system in FIG. 1A is defined as the X direction, and a direction perpendicular thereto is defined as the Y direction, thus setting an X-Y coordinate system.

Referring to FIGS. 1A and 1B, a multi-eye lens block 2 is constituted by two multi-eye lenses 20a and 20b which have the same structure. The surface on the object side of the multi-eye lens 20a (20b) is defined by three multi-eye surfaces 2a to 2c (2d to 2f) having mutually different optical axes. The surface on the opposite side of the multi-eye lens 20a (20b) is defined by a spherical surface 2g (2h) coaxial with the multi-eye surface 2b (2e). The spherical surface 2g (2h) refracts a light beam transmitted through the multi-eye surfaces 2a to 2c (2d to 2f). These surfaces are integrally formed. Note that an axis 0a0a (0b0b) of the multi-eye surface 2b (2e) and the spherical surface 2g (2h) corresponds to the optical axis of the multi-eye lens 20a (20b).

Portions respectively constituted by the surfaces 2a and 2g (the surfaces 2d and 2h), the surfaces 2b and 2g (the surfaces 2e and 2h), and the surfaces 2c and 2g (the surfaces 2f and 2h) will be referred to as elementary lenses hereinafter. The elementary lens constituted by the surfaces 2a and 2g (the surfaces 2d and 2h) forms an image of a range A corresponding to one peripheral portion in an object on a photoelectric conversion element array 4a (4b), the elementary lens constituted by the surfaces 2b and 2g (the surfaces 2e and 2h) forms an image of a range B corresponding to the central portion in the object on the photoelectric conversion element array 4a (4b), and the elementary lens constituted by the surfaces 2c and 2g (the surfaces 2f and 2h) forms an image of a range C corresponding to the other peripheral portion in the object on the photoelectric conversion element array 4a (4b).

A shutter means 1 comprises, e.g., a liquid crystal element or the like. Apertures 1a to 1f respectively correspond to the multi-eye surfaces 2a to 2f. These apertures 1a to 1f are normally closed, and are opened by a control means (not shown) for a predetermined period of time.

Reflection surfaces 3a to 3d are constituted by, e.g., mirrors. The photoelectric conversion element arrays 4a and 4b have a length p, and comprise, e.g., CCDs. A sensor package 4 mounts these photoelectric conversion element arrays 4a and 4b.

This embodiment adopts a structure in which a first light-receiving system 100a constituted by the multi-eye lens 20a, the mirrors 3a and 3b, and the photoelectric conversion element array 4a, and a second light-receiving system 100b constituted by the multi-eye lens 20b, the mirrors 3c and 3d, and the photoelectric conversion element array 4b and having basically the same structure as the first light-receiving system 100a are disposed to be separated by a base length L.

An example of numerical values of the optical system constituted by the multi-eye surface 2b and the spherical surface 2g is as follows.

Example of Numerical Values

| i  | R      | D     | N     |
|----|--------|-------|-------|
| 2b | (*)    | 4     | 1.492 |
| 2g | −82.36 | 14.28 |       |

(Note: the radius of curvature of (*) in the table above cannot be obtained since the multi-eye surface 2b is an aspherical surface.)

Note that the shape of the aspherical surface is expressed by:

$$x = \frac{h^2/R}{1 + \{1-(h/R)^2\}^{1/2}} + A_4 h^4 + A_6 h^6 + A_8 h^8 + A_{10} h^{10}$$

where
R=8.996
$A_4$=−1.057·10$^{-4}$
$A_6$=−2.767·10$^{-6}$
$A_8$=1.134·10$^{-7}$
$A_{10}$=−3.019·10$^{-9}$ In the example of the numerical values, i is the surface number, R is the radius of curvature, D is the effective aperture size, and N is the refractive index of the multi-eye lens. Also, h is the height from the optical axis 0a0a.

Note that the optical axis 0a0a of this optical system intersects the photoelectric conversion element array 4a at its center.

The multi-eye surface 2a has a shape obtained by shifting the multi-eye surface 2b by 1.093·p in the Y direction with respect to the optical axis 0a0a (1.093 is the enlargement factor when the photoelectric conversion element array 4a is viewed via the spherical surface 2g). The multi-eye surface 2c has a shape obtained by shifting the multi-eye surface 2b by 1.093·p in the Y direction but in a direction opposite to the multi-eye surface 2a with respect to the optical axis 0a0a.

Since an example of the numerical values of the multi-eye lens 20b is symmetrical to that of the multi-eye lens 20a about the Y direction, a description thereof will be omitted.

The operation of the first embodiment will be described below.

Upon distance measurement, the apertures 1a and 1d, 1b and 1e, and 1c and 1f of the shutter means 1 are respectively paired, and when one of these pairs is set in a light beam transmission state, other pairs are set in a non-transmission state.

First, the apertures 1a and 1d are opened to be set in a light beam transmission state. At this time, the other apertures are closed and set in a light beam non-transmission state. A light beam passing through the aperture 1a is refracted by the multi-eye surfaces 2a and 2g to be converted into a convergent light beam, which is deflected by the reflection surfaces 3a and 3b, thus forming an image of an object on the photoelectric conversion element array 4a. Similarly, a light beam passing through the aperture 1d forms an image of an object on the photoelectric conversion element array 4b. By calculating a correlation between the images on the photoelectric conversion element arrays 4a and 4b, distance measurement can be attained for the range A corresponding to one peripheral portion of the object on the basis of the principle of triangulation.

Next, the apertures 1b and 1e are opened and set in a light beam transmission state, and other apertures are closed and set in a light beam non-transmission state. Thus, distance measurement can be performed for the range B corresponding to the central portion of the object.

Finally, the apertures 1c and 1f are opened and set in a light beam transmission state, and the other apertures are closed to be set in a light beam non-transmission state. Thus, distance measurement can be performed for the range C corresponding to the other peripheral portion of the object.

As described above, the pairs of apertures are switched in turn, and distance measurement is performed for the three ranges (portions) A, B, and C on the object side using the same photoelectric conversion element arrays. According to this embodiment, multi-point distance measurement can be attained over a wide range three times that in a conventional apparatus. Note that the three ranges on the object side respectively correspond to the elementary lenses constituting the multi-eye lenses, and are portions separated from each other. The elementary lenses form images of the corresponding portions on the photoelectric conversion element arrays.

The switching operation of the apertures need not always be realized by a liquid crystal element. For example, the apertures may be switched mechanically.

FIGS. 2A and 2B are schematic views showing a principal part of the second embodiment of the present invention. This embodiment exemplifies an active type distance measuring apparatus, which is built in an optical apparatus such as a camera. FIG. 2A is a plan view of the first embodiment, and FIG. 2B is a front view of the first embodiment. In FIG. 2A, an object to be photographed is present on the left side. For the sake of descriptive convenience, the extending direction of the optical axis of a light-receiving system in FIG. 2A is defined as the X direction, and a direction perpendicular thereto is defined as the Y direction, thus setting an X-Y coordinate system.

Referring to FIGS. 2A and 2B, a projection lens 5, a light-emitting element 6 comprising, e.g., an iRED having light-emitting portions 6a to 6c, and the like constitute a light projection system 300.

An aperture mask 11 has apertures 11a to 11f corresponding to multi-eye surfaces 2a to 2f of a multi-eye lens block 2. Note that the aperture mask 11 is a simple mask but is not a shutter means using a liquid crystal element as described in the first embodiment. A sensor package 14 mounts photoelectric conversion elements 14a and 14b comprising, e.g., CCDs. The other elements are the same as those in the first embodiment.

Note that a multi-eye lens 20a, mirrors 3a and 3b, the photoelectric conversion element 14a, and the like constitute a first light-receiving system 200a. Also, a multi-eye lens 20b, mirrors 3c and 3d, the photoelectric conversion element 14b, and the like constitute a second light-receiving system 200b.

In this embodiment, the positional relationship between the light projection system 300 and the light-receiving systems 200a and 200b is arbitrarily determined.

The operation of this embodiment will be described below. The light-emitting portions 6a to 6c of this embodiment time-sharingly emit light in turn.

First, the light-emitting portion 6a emits light. A light spot projected from the light-emitting portion 6a onto an object illuminates a portion in a range A corresponding to one peripheral portion of an object when viewed from the light-receiving system. Of light reflected by the illuminated object, light beams passing through the apertures 11a and 11d are respectively diffracted by the multi-eye surfaces 2a and 2g and the multi-eye surfaces 2d and 2h, and finally form images on the photoelectric conversion elements 14a and 14b. At this time, since images formed by the reflected light of the light spot from the object via other apertures fall outside the photoelectric conversion elements 14a and 14b, the switching operation of the apertures executed in the first embodiment need not be performed in this embodiment.

Subsequently, the light-emitting portion 6b emits light. A light spot projected from the light-emitting portion 6b onto an object illuminates a portion in a range B corresponding to the central portion of the object when viewed from the light-receiving system. Of light reflected by the illuminated object, light beams passing through the apertures 11b and 11e are respectively diffracted by the multi-eye surfaces 2b and 2g and the multi-eye surfaces 2e and 2h, and finally form images on the photoelectric conversion elements 14a and 14b. At this time, images formed by the reflected light of the light spot from the object via other apertures fall outside the photoelectric conversion elements 14a and 14b.

Finally, the light-emitting portion 6c emits light. A light spot projected from the light-emitting portion 6c onto an object illuminates a portion in a range C corresponding to the other peripheral portion of the object when viewed from the light-receiving system. Of light reflected by the illuminated object, light beams passing through the apertures 11c and 11f are respectively diffracted by the multi-eye surfaces 2c and 2g and the multi-eye surfaces 2f and 2h, and finally form images on the photoelectric conversion elements 14a and 14b. At this time, images formed by the reflected light of the light spot from the object via other apertures fall outside the photoelectric conversion elements 14a and 14b.

In this embodiment, the interval between the light projection system and the light-receiving system is not set to be the base length as in a conventional active type distance measuring apparatus, but the interval between the two light-receiving systems 200a and 200b is set to be the base length L, and the distance to the object is calculated based on the interval between the spot images on the photoelectric conversion elements 14a and 14b. For this reason, the apparatus of this embodiment can always attain high-precision distance measurement without being influenced by vignetting, deformation, and the like of the spot, which are unique to the conventional active type distance measurement apparatus.

On the other hand, distance measurement to a far-distance object which cannot receive a light spot from the light-emitting element 6 is attained by the same method as in the passive type distance measuring apparatus described in the first embodiment. Since this embodiment does not have any shutter means, images of the ranges A, B, and C of the object are formed on the photoelectric conversion elements 14a and 14b to overlap each other. However, since an object to be subjected to distance measurement is limited by a far-distance object, if the distance of the object in the ranges A, B, and C is arranged, distance measurement can be attained without posing any serious problem. If the shutter means is provided in this embodiment, distance measurement with higher precision can be performed for a far-distance object.

Note that the photoelectric conversion element of this embodiment may be a position detection element such as a PSD (Position Sensitive Apparatus).

Note that FIGS. 2A and 2B illustrate many light rays to represent a state wherein light rays converge onto the photoelectric conversion elements 14a and 14b. For example, when only the light-emitting portion 6b emits light, i.e., when only the center of the field angle is illuminated, only light beams passing through the apertures 11b and 11e form images on portions of the photoelectric conversion elements 14a and 14b. As the distance to an object becomes smaller, the illumination position of a light spot illuminated by the light-emitting element 6 shifts toward the light projection system 300 side, and the positions of spot images on the photoelectric conversion elements 14a and 14b move in the +Y direction. At the same time, the relative interval between the two spot images on the two photoelectric conversion elements increases.

In both the first and second embodiments, the reflection surfaces for deflecting two light beams passing through the multi-eye lenses 20a and 20b and contributing to distance measurement in opposite directions, and the reflection surfaces for deflecting the light beams in the optical axis direction of the multi-eye lens 20a (20b) are disposed behind the multi-eye lenses 20a and 20b. With these reflection surfaces, the distance between the pair of photoelectric conversion elements decreases, and the two photoelectric conversion elements can be formed on the same chip, thus contributing to size and cost reductions of the apparatus and improvement of precision.

Furthermore, the apertures of the shutter means 1 in the first embodiment or the light-emitting portions of the light-emitting element 6 in the second embodiment are time-sharingly switched in turn to perform distance measurement over a wide range. In this case, if a distance measurement range is input by a selector on the camera body or by detecting a direction of the visual axis of a photographer, and is fixed, distance measurement for only the fixed range can also be performed.

With the above arrangement, the present invention realizes a compact passive type multi-point distance measuring apparatus, which can attain multi-point distance measurement with high precision in a very wide field angle range on the object side using a short photoelectric conversion element array.

Also, the present invention realizes a compact active type multi-point distance measuring apparatus, which can attain multi-point distance measurement with high precision in a very wide field angle range on the object side using a short photoelectric conversion element without being influenced by vignetting, deformation, and the like of the shape of a projected light spot by an object.

Figure 3B:
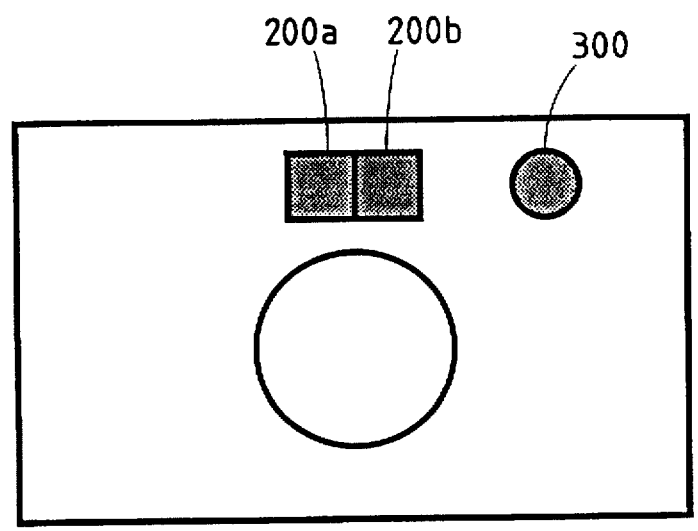

FIGS. 3A and 3B show examples wherein the multi-point distance measuring apparatuses of the first and second embodiments are used in an optical apparatus such as a camera. Thus, a compact apparatus which can attain multi-point distance measurement with high precision can be realized.

What is claimed is:

1. A multi-point distance measuring apparatus for measuring a distance to an object using a triangulation method and light received from the object, comprising:

first and second light-receiving systems each constituted by a multi-eye lens in which a plurality of elementary lenses are disposed adjacent to each other in a base line direction; and a photoelectric conversion element, wherein said first and second light-receiving systems respectively form images of plural regions of the object, which correspond to the elementary lenses constituting the multi-eye lenses and are separated from each other, on the photoelectric conversion elements.

2. An apparatus according to claim 1, further comprising:

shutter means having a plurality of apertures corresponding to the elementary lenses of the multi-eye lenses, and wherein said shutter means switches images to be formed on the photoelectric conversion elements of a portion of the object by time-sharingly controlling an opening/closing operation of the apertures.

3. An apparatus according to claim 1, further comprising:

a first reflection surface for deflecting light beams transmitted through the multi-eye lenses of said first and second light-receiving systems in opposite directions; and a second reflection surface for deflecting the light beam deflected by said first reflection surface in directions parallel to optical axes of the multi-eye lenses.

4. An apparatus according to claim 1, further comprising:

a light projection system for projecting a light spot onto the object, and wherein said first and second light-receiving systems form images of light reflected by the object of the light spot projected by said light projection system on said photoelectric conversion elements.

5. An apparatus according to claim 4, wherein said light projection system time-sharingly switches and projects the light spot to each of the plural regions of the object, which correspond to the elementary lenses constituting the multi-eye lenses and are separated from each other.

6. An apparatus according to claim 4, wherein said first and second light-receiving systems form images of light from the object on said photoelectric conversion elements, except light reflected by the object of the light spot, in a case where images of light reflected by the object of the light spot were not formed on said photoelectric conversion elements.

7. An optical apparatus, comprising:

an imaging optical system for forming an image of an object; and a multi-point distance measuring apparatus for measuring a distance to the object using a triangulation method and light received from the object, the multi-point distance measuring apparatus, including:

first and second light-receiving systems each constituted by a multi-eye lens in which a plurality of elementary lenses are disposed adjacent to each other in a base line direction; and a photoelectric conversion element, wherein said first and second light-receiving systems respectively form images of plural regions of the object, which correspond to the elementary lenses constituting the multi-eye lenses and are separated from each other, on the photoelectric conversion elements, and wherein said imaging optical system effects focusing based on the distance measured by said multi-point distance measuring apparatus.

8. An optical apparatus according to claim 7, further comprising:

shutter means having a plurality of apertures corresponding to the elementary lenses of the multi-eye lenses, and wherein said shutter means switches images to be formed on the photoelectric conversion elements of a portion of the object by time-sharingly controlling an opening/closing operation of the apertures.

9. An optical apparatus according to claim 7, further comprising:

a first reflection surface for deflecting light beams transmitted through the multi-eye lenses of said first and second light-receiving systems in opposite directions; and a second reflection surface for deflecting the light beam deflected by said first reflection surface in directions parallel to optical axes of the multi-eye lenses.

10. An optical apparatus according to claim 7, further comprising:

a light projection system for projecting a light spot onto the object, and wherein said first and second light-receiving systems form images of light reflected by the object of the light spot projected by said light projection system on said photoelectric conversion elements.

11. An optical apparatus according to claim 10, wherein said light projection system time-sharingly switches and projects the light spot to each of the plural regions of the object, which correspond to the elementary lenses constituting the multi-eye lenses and are separated from each other.

12. An optical apparatus according to claim 10, wherein said first and second light-receiving systems form images of light from the object on said photoelectric conversion elements, except light reflected by the object of the light spot, in a case where images of light reflected by the object of the light spot are not formed on said photoelectric conversion elements.

13. An optical apparatus according to any one of claims 7 to 12, comprising a camera.

* * * * *